Jan. 8, 1935. W. B. PIPER Re. 19,417

ILLUMINATED SIGN

Original Filed Nov. 27, 1929 2 Sheets-Sheet 1

INVENTOR.
William B. Piper,
BY
John Boyle Jr.
ATTORNEY.

Jan. 8, 1935. W. B. PIPER Re. 19,417

ILLUMINATED SIGN

Original Filed Nov. 27, 1929 2 Sheets-Sheet 2

INVENTOR.

William B. Piper,

BY

John Boyle Jr.

ATTORNEY.

Reissued Jan. 8, 1935

Re. 19,417

UNITED STATES PATENT OFFICE 19,417

ILLUMINATED SIGN

William B. Piper, Memphis, Tenn., assignor, by direct and mesne assignments, to Gasmold Sign Corporation, Memphis, Tenn., a corporation of Tennessee Original No. 1,894,704, dated January 17, 1933, Serial No. 410,043, November 27, 1929. Application for reissue October 24, 1934, Serial No. 749,783

6 Claims. (Cl. 40—130)

This invention pertains to improvements in illuminated signs of the tubular type filled with neon or other gas made luminous by the passage therethrough of an electrical current.

An object of the invention is to eliminate the awkward appearance of the present type of neon signs and to materially reduce the manufacturing cost of same by providing an improved method of making and assembling the units or letters of the sign so as to entirely eliminate the use of tubing for connecting the sign units, with the exception of the jumper tubes, which in the present invention are effectively hidden from view.

With the above and other objects in view as will be apparent from the following detailed description, the invention consists in the novel construction, arrangement and combination of parts, together with the process and method of making and forming said parts, as is more fully explained and hereinafter pointed out, reference being had to the accompanying drawings, wherein.

Figure 1:
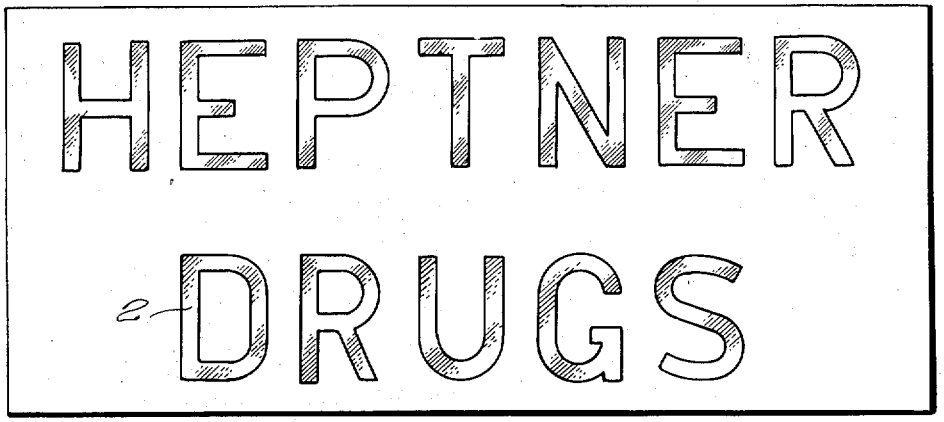
Figure 1 is a front view of a sign constructed in accordance with the invention.
Figure 2:
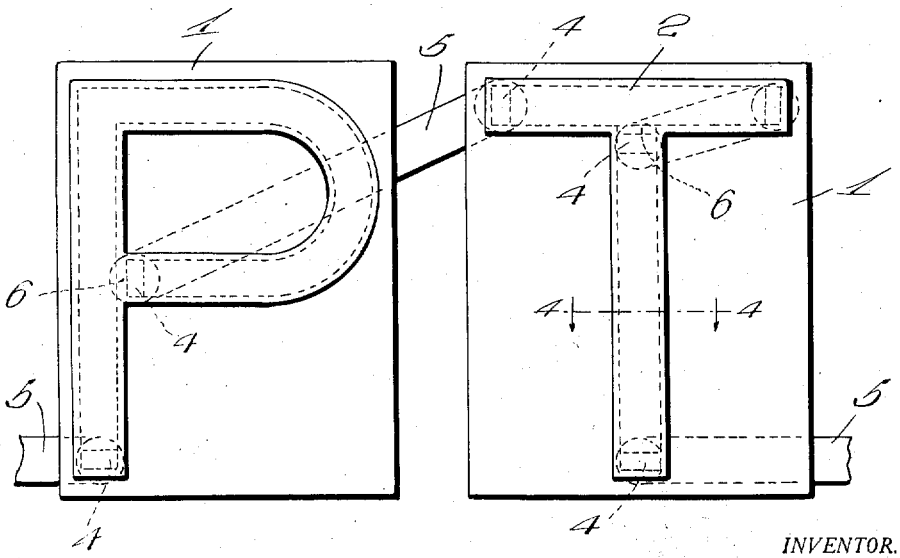
Figure 2 is a front view on an enlarged scale of a pair of panel-like sign units.
Figure 3:
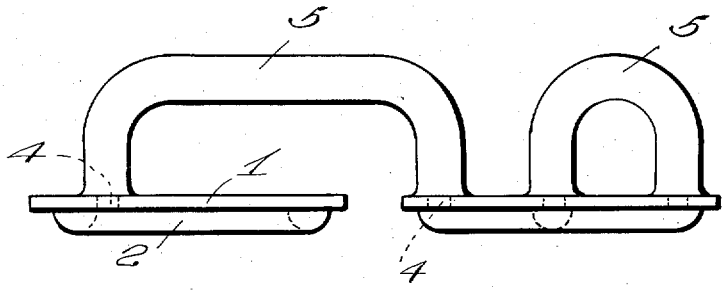
Figure 3 is a top view of the unit appearing in Figure 2.
Figure 5:
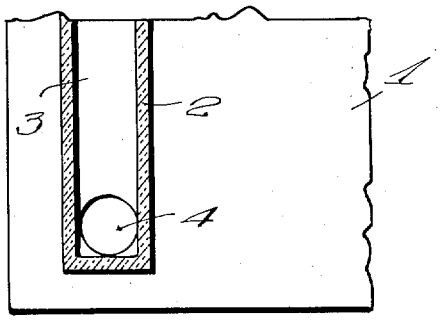
Figure 5 is a detail view of a letter panel with the letters shown in section and provided with a rounded or circular passage for the gas.
Figure 4:
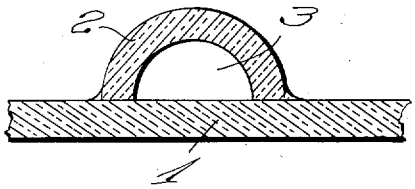
Figure 4 is a cross section on line 4—4 of Figure 2.
Figure 6:
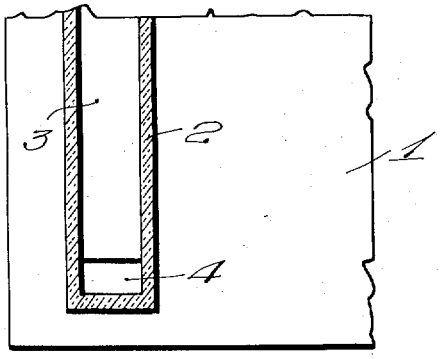
Figure 6 is a similar view of another panel having a square or rectangular gas entrance.

Under the present system of forming neon signs by blowing and bending tubing and connecting the signs by such tubing, the manufacturing costs are excessive, especially where it is necessary, as in certain letters such as those which double back with their tubing, to get a complete connection of the gas and electricity through the tubing and sign.

As an improvement, therefore, in the manufacture of neon gas signs at a material reduction in cost over the present method, this invention consists in moulding letters, instead of blowing and bending tubing which has heretofore caused the excessive expense, and the letters after such moulding are attached to a glass base by a process of fusing which is common to the art of glass manufacturing.

As will be observed from the drawings, the sign is made up of units respectively consisting of a glass panel 1 having a moulded glass letter or character 2 of channel like cross section fused thereon in such a way that the channel part is disposed against the panel 1 so as to provide a gas passage 3.

The letters may be of any size desired and of either half round or half square mould, as preferred. Before the letters are fused to the panels, the latter are perforated at the proper points and through the thickness of the glass to provide gas inlets and outlets 4, communicating with the gas passage of the letter.

As illustrated in the drawings, these perforations or passages may be either round or square according as the case may require or prove to be the most satisfactory. When the fusing of the required number of letters is complete to make a sign, the various units or panels are assembled in a metal frame or sign cabinet and the glass jumper tubes 5 are fused to the panels 1 over the openings 4 in such a manner as to provide a continuous gas filled tubular passage for the flow of the electric current.

Any doubling back necessary, is done before the openings 4 of the letters are covered and it will be noted that none of the jumper tube connections are made directly in contact with the letters but that they are made on the backs of the panels and over the openings 4 which run through to a point where the most practical connection can be made to the letters or at the most serviceable point.

It will be observed, also, that there is no doubling back with letters, this being obviated by the jumper tube 5 behind the sign where the mechanism is enclosed. Hence all the letter connections are thus made from behind the glass panels, no portions of the connections are visible from a front view of the sign as will be apparent from the showing of Figure 1.

Each letter is on a separate panel so that in case of breakage, the entire sign need not be taken down to repair one letter, but only such section or sections thereof as is to be repaired or replaced.

The units or sections may be assembled in various types of sign cabinets and the completed sign will be illuminated in the customary manner by using electrodes connected to the jumper tubes at the required point.

The jumper tubes, electrodes and transformers may be wrapped with asbestos or similar material for protection from breakage by cold weather.

Where the letter or character to be illuminated has a loop portion, as in the upper part of the letter P, or a branch portion as in the upper part of the letter T, complete illumination of every part of such types of letters can be had only by blocking off the gas passage 3 at certain points so as to provide a single path through which the current can pass from one electrode to the other. Where there are two independent channels through which the current may pass from one electrode to the other, it will pass through the shorter channel leaving the longer channel not illuminated. For instance, in the letter P, the closure or partition 6 will cause the current to pass from the electrode in the jumper tube at the bottom of the stem of the letter, up to the top around the loop clockwise and exit through the opening 4 adjacent the partition 6. In the absence of the partition 6, the current from the electrode at the bottom of the letter would take the shortest path and pass out through the other opening 4, leaving the upper part of the letter not illuminated.

In the same way the presence of the closure or partition 6 in the letter T, will cause the current to pass through the horizontal arm from the left hand opening 4 to the corresponding opening on the right hand of the horizontal arm, then through the jumper tube 5 in the back of the letter, through the opening 4 below the partition 6, down the vertical stem of the letter and exit through the opening 4 at the lower end of the tube. In the absence of the partition 6 in the letter T, the current would not pass through the right hand arm of the letter T, and hence that part would not be illuminated.

Having thus described my invention, what I claim as new is:

1. In a sign, a plurality of glass panels, characters having bodies curved transversely and having the edges thereof fused to said panels forming passages for the insertion of a gas, said panels having openings extending entirely therethrough and communicating with said passages and jumper tubes extending across the backs of said panels and fused at the ends thereof to the backs of the panels in communication with the openings in the panels establishing communication between said passages.

2. An illuminated molded glass sign comprising a glass panel, a molded glass character, provided with a channel throughout its length shaped to the outline of the character, with the open part of the channel being disposed against the panel to provide a passage for illuminating gas, the panel and the molded glass character being fused together into a unit, inlet and outlet openings, for the flow of electric current, communicating with said passage, the said passage having a portion thereof in communication with one of said openings which continues into a loop portion, the loop portion being continued toward the other of said openings but separated from the first portion of the passage by a partition to provide a continuous one way channel between the inlet and outlet openings, whereby the current traverses every portion of the passage.

3. An illuminated molded glass sign comprising a glass panel, a molded glass character, provided with a channel throughout its length shaped to the outline of the character, with the open part of the channel being disposed against the panel to provide a passage for illuminating gas, the panel and the molded glass character being fused together into a unit, inlet and outlet openings, for the flow of electric current, communicating with said passage, the said passage having a portion thereof in communication with one of said openings and a branch portion with a closed end, in communication with the other opening, the branch portion of the passage being closed adjacent the first portion of the passage by a partition, the said first portion and an end of the branch portion being bridged by a jumper channel, to provide a one way channel between the inlet and outlet openings, whereby the current traverses every portion of the passage.

4. An illuminated molded glass sign comprising a glass panel, a molded glass character, provided with a channel throughout its length shaped to the outline of the character, with the open part of the channel being disposed against the panel to provide a passage for illuminating gas, the panel and the molded glass character being fused together into a unit, inlet and outlet openings, for the flow of electric current, communicating with said passage, the channel forming the outline of the character having a plurality of differently directed portions, one portion being separated from the other by a partition, to make a continuous one way channel of the said portions between the inlet and outlet openings, whereby the current traverses every portion of the passage.

5. An illuminated molded glass sign comprising a glass panel, a molded glass character, provided with a channel throughout its length shaped to the outline of the character, with the open part of the channel being disposed against the panel to provide a passage for illuminating gas, the panel and the molded glass character being fused together into a unit, inlet and outlet openings, for the flow of electric current, communicating with said passage, the channel forming the outline of the character having a plurality of differently directed portions, one portion being separated from the other by a partition and connected by a jumper channel, to make a continuous one way channel of the said portions between the inlet and outlet openings, whereby the current traverses every section of the passage.

6. An illuminated molded glass sign comprising a glass panel, a molded glass character, provided with a channel throughout its length shaped to the outline of the character, with the open part of the channel being disposed against the panel to provide a passage for illuminating gas, the panel and the molded glass character being fused together into a unit, inlet and outlet openings, for the flow of electric current, communicating with said passage, the channel forming the outline of the character having a plurality of differently directed portions, means for converting the said portions into a continuous one way channel and comprising a jumper channel carried by the back panel and connecting the said portions, whereby the current traverses every section of the passage.

WILLIAM B. PIPER.